INVENTOR
KENT REANEY GREER
BY Cushman, Darby & Cushman
ATTORNEYS

March 26, 1968     K. R. GREER     3,374,994
PACKING UNITS FOR GAS-LIQUID CONTACT APPARATUS
Filed March 4, 1966     4 Sheets-Sheet 3

INVENTOR
KENT REANEY GREER
BY Cushman, Darby & Cushman
ATTORNEYS

INVENTOR
KENT REANEY GREER
BY Cushman, Darby & Cushman
ATTORNEYS

United States Patent Office 3,374,994
Patented Mar. 26, 1968

3,374,994
PACKING UNITS FOR GAS-LIQUID
CONTACT APPARATUS
Kent Reaney Greer, Marple Bridge, England, assignor to Imperial Chemical Industries Limited, London, England, a corporation of Great Britain
Continuation-in-part of application Ser. No. 211,377, July 20, 1962. This application May 4, 1966, Ser. No. 547,603
Claims priority, application Great Britain, Mar. 4, 1963, 8,612/63
6 Claims. (Cl. 261—112)

This is a continuation-in-part of application, Ser. No. 211,377, filed July 20, 1962, now Patent No. 3,260,511 and of application, Ser. No. 349,457, filed Mar. 4, 1964.

This invention relates to an improved packing unit for the treatment of liquids which are allowed to flow as a film over the surfaces in the packing unit. Packing units in accordance with this invention are particularly suited for use in cooling towers.

There are many different types of cooling tower but they can be divided broadly into two main types; the atmospheric open type in which the water is sprayed over a structure open to the atmosphere and the chimney type in which the cooling is carried out within an enclosed space, the cooling medium being supplied by induced or forced draught. The draught may be horizontal or vertical. Cooling hot water is normally carried out by allowing the water to pass downwards in such a manner as to present a large surface area to contact with a counter- or cross-current of a cold fluid, usually air. The air may enter at the bottom of the tower for counter-current cooling or may be caused to enter the side of the tower when cross-current cooling is preferred.

It is apparent that the greater the surface area of a given body of water presented to the cold air, the more efficient will be the cooling of the water, and the attainment of large surface area-to-volume for the water has been achieved in different ways. In early forms the water was sprayed onto a system of closely spaced laths and slats inclined to the vertical and placed below the point of distribution of the water and within an uprising current or cross-current of cold air; the water ran down the inclined surfaces of one set of laths and dripped onto another set which was placed in spaced relationship below the first set and this process was repeated down the tower. The system is known as droplet cooling. Recently larger surface areas per unit volume have been attained by causing the water to flow downwards as a film over continuous supporting surfaces thus presenting a very large surface area to the current of cooling air.

For this second and improved method of water cooling known as film-flow cooling it is clear that the greater the surface area available to act as a support for the water film within a given space, the more efficient will be the cooling. Hitherto, conventional film-flow packings have been constructed from wood, from asbestos, or, more recently, from expanded plastic materials. Other film-flow packings have been constructed from plastic materials which have been extrusion or injection moulded in the form of grids. The packings fabricated from wood, expanded plastic material and to a certain extent asbestos are made normally from rather thick materials in order to maintain rigidity, and thicknesses of the order of 0.375 inch are generally used. The thickness of the material necessarily places a limit on the maximum film supporting area obtainable in any given space.

It is an object of the present invention to provide a film-flow packing which presents a large surface area per unit space occupied by the packing.

According to the present invention we provide a packing unit for the treatment of liquids which are allowed to flow as a film over the surfaces in the packing comprising: a stack of alternate flat and corrugated sheets of rigid thermoplastic organic polymeric material, one side of said corrugated sheets abutting one side of said flat sheets and forming curvilinear lines of contact on said one side of said flat sheets, the other side of said corrugated sheets abutting the other side of said flat sheets and forming curvilinear lines of contact on said other side of said flat sheets, the said lines of contact on opposed sides of each of said flat sheets being at least intermittently coincident. Preferably the flat and corrugated sheets are also held together by attaching said corrugated sheets to, and on opposed sides of, said flat sheets at positions where the lines of contact on opposed sides of flat sheets are coincident.

In our invention the lines of contact between the corrugated sheets and flat sheets on opposed sides of the flat sheet coincide either along lines or at points. Also the corrugated and flat sheets may be attached to each other at some or all positions where the lines of contact coincide.

In our invention we prefer to use sinusoidal or substantially sinusoidal corrugations and so in this preferred form of our invention the lines of contact with a flat sheet will follow sinusoidal or substantially sinusoidal paths in the plane of the flat sheet.

In one form of our invention the line of the corrugations, and so the lines of contact with a flat sheet, of a corrugated sheet on one side of the flat sheet follow paths which are the same as the paths followed by the line of the corrugations, and so the lines of contact with the flat sheet, of the corrugated sheet on the other side of that same flat sheet. In this form of our invention the lines of contact between a flat sheet and the corrugated sheets on opposed sides of the flat sheet will coincide along their whole length.

Preferably in our invention the line of the corrugations, and so the lines of contact with a flat sheet, of a corrugated sheet on one side of the flat sheet follow paths which are the reverse, or opposite of the paths followed by the line of the corrugations, and so the lines of contact with the flat sheet, of the corrugated sheet on the other side of that same flat sheet. In this case the lines of contact between a flat sheet and the corrugated sheets on opposed sides of the flat sheet will coincide at certain points.

The corrugated sheets used in our invention, being made from a thermoplastic organic polymeric material, are normally manufactured by moulding techniques, for example by vacuum forming. In the preferred form of our invention mentioned in the previous paragraph identical corrugated sheets can be used throughout the packing so dispensing with the need for different moulds for the corrugated sheets.

By rigid thermoplastic organic polymer material, we mean any thermoplastic organic polymeric material having a Young's modulus of the order of $10^5$ lbs./square inch or more. Examples of rigid thermoplastic organic polymeric materials which may be used include polyvinyl chloride, polymethyl methacrylate, polypropylene, polyethylene, polyvinylidene chloride, copolymers of vinyl chloride and vinyl acetate, polystyrene, oxymethylene polymers, rubber/resin composition (e.g. mixtures of butadiene/acrylonitrile copolymer rubbers and styrene/acrylonitrile resins) and polyesters such as polyethylene terephthalate.

In order that the invention may be more clearly understood it will now be described with the aid of the accompanying drawings wherein.

Figure 2:
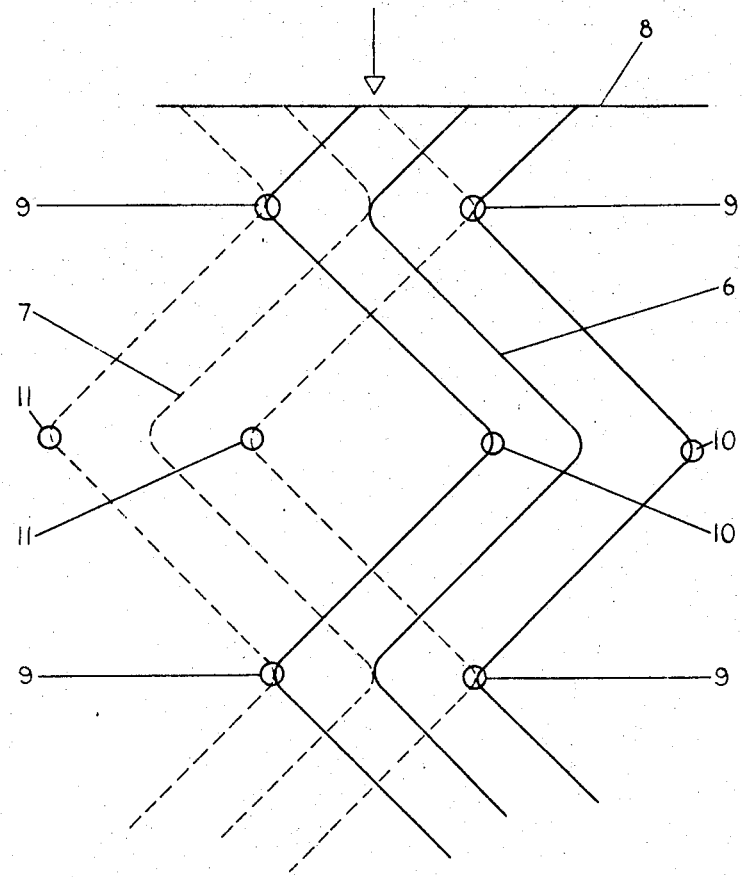
FIGURE 2 is an elevation view of one corrugation of a corrugated sheet fastened to a flat sheet in another form of packing unit, the position of the corresponding corrugation of a corrugated sheet attached to the other side of the flat sheet being shown by broken lines.
Figure 3:
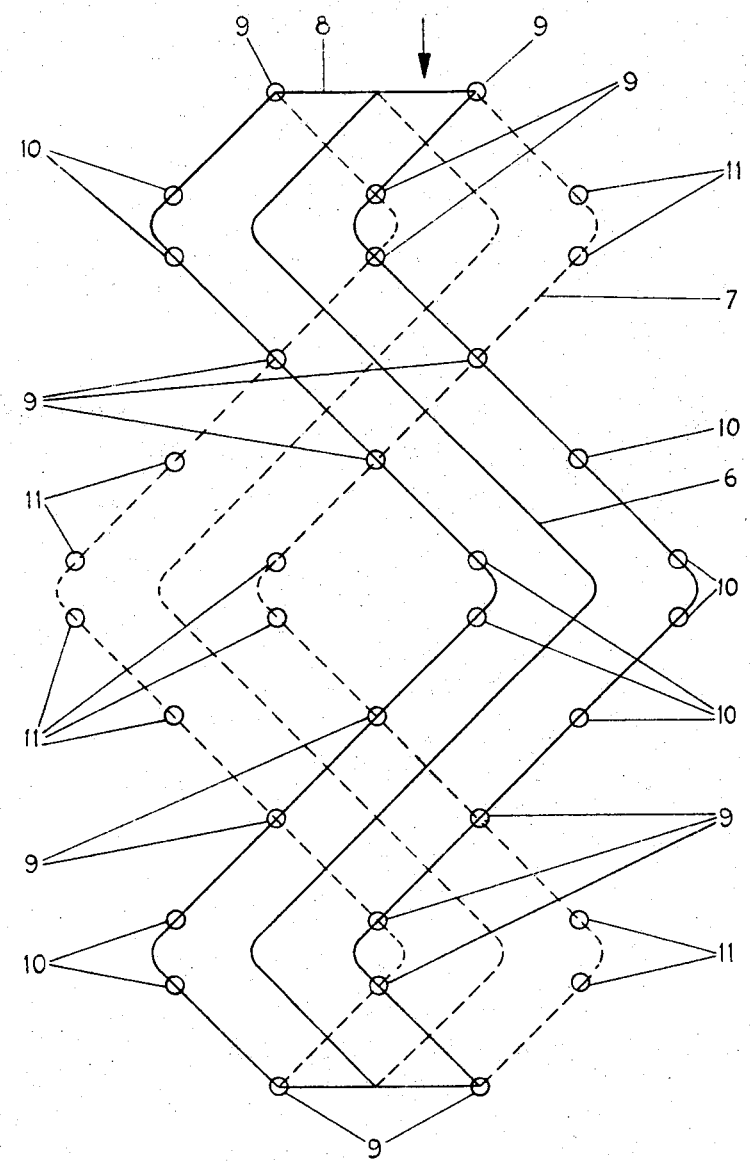
Figure 4:
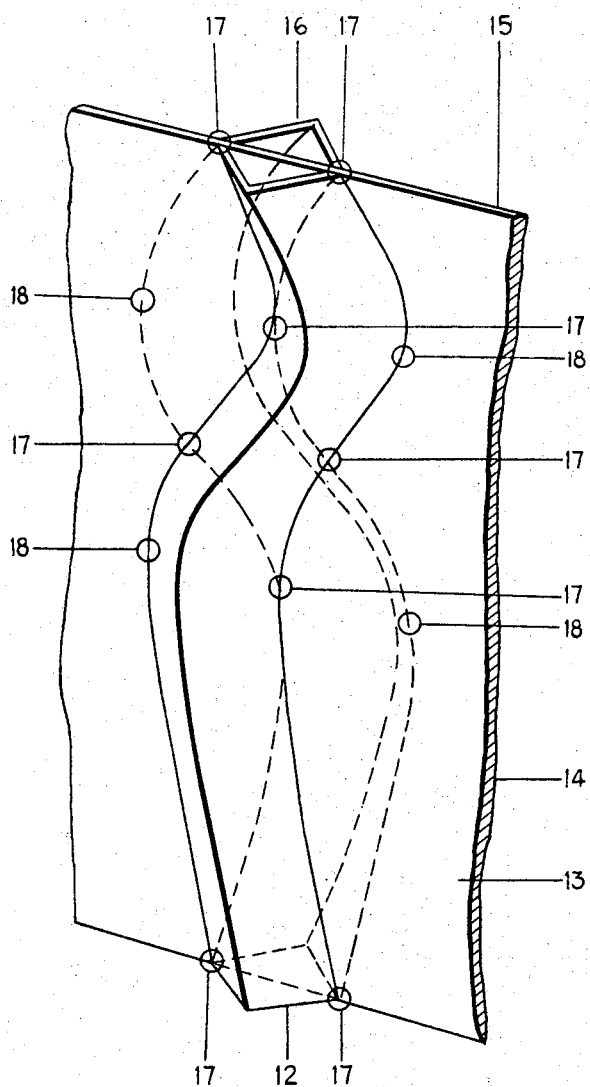

FIGURE 3 is an elevation view of one corrugation of a corrugated sheet fastened to a flat sheet in a similar form of packing unit, to that shown in FIGURE 2, the position of the corresponding corrugation of a corrugated sheet attached to the other side of the flat sheet being shown by broken lines; and FIGURE 4 shows a perspective view of one corrugation of a corrugated sheet fastened to a flat sheet in yet another form of packing unit, the position of the corresponding corrugation of a corrugated sheet attached to the other side of the flat sheet being shown by broken lines.

FIGURE 4 is a perspective view of yet another form of packing.

Figures 1, 5:
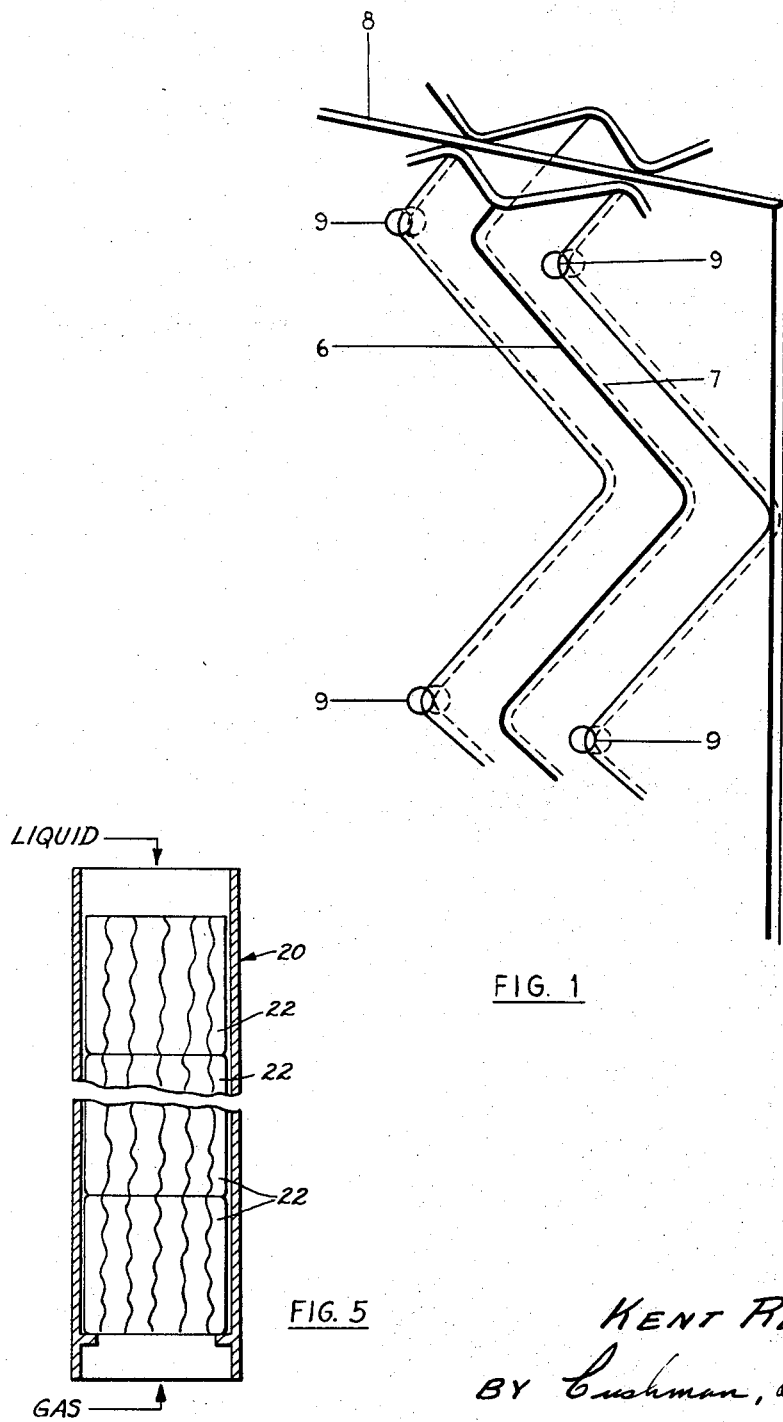
FIGURE 1 shows a perspective view of one corrugation of a corrugated sheet fastened to a flat sheet in one form of packing unit, the position of the corresponding corrugation of a corrugated sheet attached to the other side of the flat sheet being shown by broken lines.

FIGURE 5 is a vertical sectional view of a gas-liquid contact apparatus containing a plurality of the packing units of the present invention.

In FIGURES 1, 2 and 3 a corrugation 6 of one sheet is shown by full lines and a corrugation 7 of the sheet fastened on the other side of the interposed flat sheet is shown by broken lines (for simplicity only one corrugation is shown in each corrugated sheet). The edge of the packing unit is indicated at 8, the liquid entering the unit in the direction of the arrow. The positions where the corrugation 6 of one corrugated sheet is attached to the flat sheet and the positions where the corrugation 7 of the second corrugated sheet is attached to the opposed side of the same flat sheet are indicated as circles number 9, these positions being at least some of the points where the lines of contact on opposed sides of the flat sheet coincide. The circles numbered 10 and 11 indicate other positions where corrugations 6 and 7 respectively are also attached to the flat sheet, these positions being the points where the lines of contact of corrugations 6 and 7 coincide with lines of contact of other corrugations (which are not shown).

In addition to being attached at the positions mentioned above, the corrugated and flat sheets may be fastened together at other points and in some cases the corrugated sheet may be attached to the flat sheet, by means of a suitable adhesive, along the lines of contact of the corrugated sheet with the flat sheet.

In FIGURE 4, the shape of the corrugations is designed so that, when mounted vertically, all the water or other liquid entering the corrugations contacts the surfaces of the corrugation. In this case one corrugation 12 of a corrugated sheet is shown fixed to the front face 13 of a flat sheet 14, and one corrugation 16 of a second corrugated sheet is shown fixed to the rear surface 15 of the sheet 14. For simplicity, only one corrugation of each corrugated sheet is shown. The three sheets are fastened together by press studs and sockets or other attachment areas preformed in the sheets at the points encircled and numbered 17. The points encircled and numbered 18 correspond to points where the corrugations shown are fastened to the corrugations forming the remainder of the two corrugated sheets.

FIGURE 5 illustrates schematically a gas-liquid contact apparatus, such as a cooling tower, comprising a vertical hollow tower structure 20 containing a plurality of the packing units 22 of the present invention suitably supported within the tower structure. In operation of the apparatus liquid enters the top of the tower structure and flows downwardly over the surfaces of the packing units 22 while cooling gas passes upwardly through the passages in the units 22.

The flat and corrugated sheets may be fabricated from a single sheet of rigid thermoplastic organic polymeric material or may be fabricated from what is in effect a laminate of two or more sheets of the same or different thicknesses.

We prefer the corrugated sheets to have a V-shaped cross section in the form of an equilateral triangle, since then the packing unit has good rigidity combined with a high surface area for the space occupied.

In our preferred embodiments, the equilateral triangle has a side length of 1.5" but this is by no means critical. The thickness of the flat and corrugated sheets may be chosen within a wide range of limits which depends mainly on the type of material being used and the service conditions. On the whole, we have found that in our preferred construction using sheet formed from the copolymer of vinyl chloride and vinyl acetate, the use of a sheet thickness of the order of from 0.01" to 0.03" gives rigid units capable of spanning the distances likely to be encountered in the common run of water cooling towers. Suitable methods for holding the sheets together are described in the aforesaid Patent No. 3,260,511. Alternatively they may also be held together by any usual means such as for example pinning, cementing, high frequency welding or by the use of clamps or other devices.

Sheets measuring 72 inches by 18 inches can be used to build up a packing unit with final dimensions of approximately 72 inches by 18 inches by 18 inches. A unit of about this size is preferred because it is of convenient size and will not be too heavy to be handled by one man. However, other considerations such as for example distances between supports for the unit may well lead to the use of units of much larger or smaller size.

Although in our preferred embodiment we prefer to use corrugated material of which the corrugations are V-shaped in cross-section, our invention includes equally the use of corrugations of any cros-section whether it be straight sided or in the form of a continuous curve or in any intermediate form. However, when corrugations with a substantially curved cross-section are used, there is a likelihood of loss of rigidity in the structure. Similarly, the cross-section of the corrugation mentioned in our preferred embodiment need not be in the form of an equilateral triangle. Any corrugation angle may equally well be used in our invention, but the use of an angle of 60° combined with a V-shaped cross-section to give an equilateral triangle provides a structure with the optimum combination of rigidity and available surface area for the space occupied and the use of other angles will result either in loss of rigidity or in loss of available surface area.

The distance between adjacent peaks on the corrugated sheet is not critical and any distance may be chosen. However, it is apparent that as this distance is increased, the available surface area of the resultant unit for any given space occupied will be reduced and as the distance is decreased, more material per unit space will be required with consequent increase in cost and weight of the structure. We have found that our preferred dimension of 1.5" results in a most useful combination of these variables. However, in many cases a larger dimension is preferred, for example, for reasons of economy or weight or in order to reduce the surface area to volume ratio.

Our packing units may be used as individual units or stacked in nests and may be held in a skeletal supporting framework within the walls of the tower. They may be sawn to shape to fit in angles or to coincide with curved shapes such as for example the inside surface of the wall of a conventional hyperboloidally shaped counter-draught cooling tower of circular or substantially circular cross-section. Our units may also be used in the construction of spray eliminators at the top of counter-draught type cooling towers.

Since our units are built from rigid thermoplastic materials, as hereinbefore defined, they still maintain their rigidity when the thickness of the material used is much less than when wood or asbestos is the construction material and in consequence our units provide a film-flow packing with an available surface area per space occupied considerably greater than a similar packing made from such materials. Also, the unit itself is considerably lighter than the said counterparts of similar size while still maintaining rigidity and strength and, since the packing can be built up from individual units, the upkeep and maintenance of the packing is considerably facilitated as the individual units may be replaced wieh ease. The packing is very corrosion-resistant and does not rot as in the case of timber. In addition, due to its corrosion-resistant properties, packings of this type may be used for cooling corrosive liquors.

Apart from the packing units of our invention being suitable for use in towers and other apparatus for cooling liquids, they may also be used in any application where it is desirable to contact a large surface area with a liquid. Such applications include chemical plant and the treatment of effluents with micro-organisms. When corrosive liquids are used the material of the packing will of necessity have to be selected for resistance to corrosion from the liquids that will be encountered.

Having described the invention I claim:

1. A gas-liquid contact unit for apparatus in which a gas stream contacts a film of liquid flowing as a film over the surfaces of a contact unit, said unit comprising:
    alternate flat and corrugated sheets of rigid thermoplastic organic polymeric material stacked in contact, the corrugations of each corrugated sheet having apices forming lines of contact with the flat sheets;
    all the corrugated sheets defining with all the flat sheets a plurality of passages all of which extend from one common face of the stack to the opposite face;
    the corrugations in the corrugated sheets being curvilinear throughout substantially their entire length so that the said lines of contact and the passages are similarly curvilinear;
    the said lines of contact on opposite sides of each of the flat sheets being at least partially coincident; and
    the stack being held together by attachments between the corrugated sheets and the flat sheets at at least some of the positions where the lines of contact on opposite sides of the flat sheets are coincident.

2. A contact unit as in claim 1 in which the corrugations of said corrugated sheets are substantially sinusoidal.

3. A contact unit as in claim 1 in which the corrugations which contact opposite sides of each flat sheet form lines of contact with said flat sheet which are the reverse of each other.

4. A contact unit as in claim 3 in which the corrugations of said corrugated sheets are substantially sinusoidal.

5. A contact unit as in claim 1 in which the corrugations which contact opposite sides of each flat sheet form lines of contact with said flat sheet which are directly opposite each other.

6. Liquid-gas contact apparatus for contacting a gas stream with a film of liquid flowing over contact surfaces within the apparatus, said apparatus including at least one packing unit for obtaining a large contact surface, said packing unit comprising:
    alternate flat sheets and corrugated sheets of rigid thermoplastic organic polymeric material stacked in contact, the corrugations of each corrugated sheet having apices forming lines of contact with adjacent flat sheets;
    all the corrugated sheets defining with all the flat sheets a plurality of passages all of which extend from one common face of the stack to the opposite face;
    the corrugations in the corrugated sheets being curvilinear throughout substantially their entire length so that the said lines of contact and the passages are curvilinear;
    the said lines of contact on opposite sides of each of the flat sheets being at least partially coincident, and
    the stack being held together by attachments between the corrugated sheets and the flat sheets at at least some of the positions where the lines of contact on opposite sides of the flat sheets are coincident.

References Cited

UNITED STATES PATENTS

| | | | |
|---|---|---|---|
| 520,366 | 5/1894 | Leaver | 161—136 |
| 1,240,231 | 9/1917 | Lumley | 161—137 |
| 2,091,918 | 8/1937 | Finck | 161—136 X |
| 2,286,479 | 6/1942 | Farr | 55—488 |
| 2,746,892 | 5/1956 | Elfving | 161—136 |
| 2,764,257 | 9/1956 | Brixius | 55—521 X |
| 2,986,379 | 5/1961 | Kramig | 261—112 X |
| 3,112,184 | 11/1963 | Hollenbach | 161—68 X |
| 3,262,682 | 7/1966 | Bredberg | 261—29 |

FOREIGN PATENTS

| | | |
|---|---|---|
| 238,412 | 9/1911 | Germany. |
| 450,524 | 4/1935 | Great Britain. |
| 875,611 | 8/1961 | Great Britain. |

HARRY B. THORNTON, *Primary Examiner.*

E. H. RENNER, *Assistant Examiner.*